(12) United States Patent
Willis

(10) Patent No.: US 6,863,612 B2
(45) Date of Patent: Mar. 8, 2005

(54) SYSTEM AND METHOD FOR INTERACTIVE ON-LINE GAMING

(75) Inventor: Daniel Willis, Stittsville (CA)

(73) Assignee: BiDamic Inc., Nepean (CA)

(*) Notice: Subject to any disclaimer, the term of this patent is extended or adjusted under 35 U.S.C. 154(b) by 0 days.

(21) Appl. No.: 10/232,574

(22) Filed: Sep. 3, 2002

(65) Prior Publication Data

US 2004/0043818 A1 Mar. 4, 2004

(51) Int. Cl.$^7$ .................................................. A63F 9/24
(52) U.S. Cl. ......................................... 463/42; 463/43
(58) Field of Search .............................. 463/40, 41, 42, 463/43, 44; 709/203, 212, 216, 218–227

(56) References Cited

U.S. PATENT DOCUMENTS

| | | | |
|---|---|---|---|
| 5,791,992 A | * | 8/1998 | Crump et al. .................. 463/41 |
| 5,805,814 A | | 9/1998 | Tsuda et al. |
| 2001/0037407 A1 | * | 11/2001 | Dragulev et al. ........... 709/250 |
| 2002/0026474 A1 | | 2/2002 | Wang et al. |
| 2002/0038451 A1 | * | 3/2002 | Tanner et al. ............... 717/105 |
| 2002/0073201 A1 | | 6/2002 | French et al. |
| 2003/0115065 A1 | * | 6/2003 | Kakivaya et al. ......... 704/270.1 |
| 2003/0172138 A1 | * | 9/2003 | McCormack et al. ....... 709/220 |
| 2004/0015608 A1 | * | 1/2004 | Ellis et al. ................... 709/246 |

FOREIGN PATENT DOCUMENTS

| | | |
|---|---|---|
| EP | 1 078 667 A1 | 2/2001 |
| GB | 2 341 774 A | 3/2000 |
| WO | WO 00/72583 A1 | 11/2000 |
| WO | WO 01/80023 A1 | 10/2001 |

* cited by examiner

Primary Examiner—Kim Nguyen
(74) Attorney, Agent, or Firm—Freedman & Associates

(57) ABSTRACT

An interactive gaming system includes customer located equipment and a gaming service provider. The customer located equipment is connected to the gaming service provider through a broadband access network, and includes a gaming console. The gaming console stores gaming software, runs the gaming software and stores an ultra-thin. The ultra-thin client establishes a connection between the gaming console and the service provider, controls game events according to messages sent to and received from the gaming service provider, and provides an adaptive platform for a consistent gaming environment. Further, a method for providing an interactive gaming system service includes connecting customer located equipment and a gaming service provider through a broadband access network, establishing a connection between the gaming console and the service provider through the ultra-thin client, and controlling game events according to messages sent to and received from the gaming service provider.

22 Claims, 6 Drawing Sheets

SYSTEM AND METHOD FOR INTERACTIVE ON-LINE GAMING

FIELD OF THE INVENTION

The present invention generally relates to interactive gaming systems, and more specifically to on-line gaming systems wherein a plurality of gaming consoles are connected through a broadband network.

BACKGROUND OF THE INVENTION

The general idea of an interactive system, wherein individuals respond to a broadcast signal, has already been recognized in the early seventies of the last century, and thus has been developed at the same time when the first video games appeared on the market. For example, U.S. Pat. No. 3,789,136 to Haith et al., issued Jan. 29, 1974, describes an electronic system whereby television viewers may interact with a broadcast television signal for educational purposes, and U.S. Pat. No. 4,745,468 to Von Kohorn, issued May 17, 1988, teaches an interactive system wherein an evaluation is made as to the correctness and speed of responses made by a plurality of individuals at remote locations.

Furthermore, U.S. Pat. No. 5,841,980 to Waters et al., issued Nov. 24, 1998, describes a system for communication networks in multi-user applications. The system is designed to overcome bandwidth limitations and thus facilitate large-scale national participation in multiple user applications over a computer network. U.S. Pat. No. 5,890,963 to Yen, issued on Apr. 6, 1999, discloses a system for maintaining continuous and progressive game play in a computer network, and U.S. Pat. No. 5,964,660 to James et al., issued Oct. 12, 1999, also teaches a networked multi-player game. These games are examples for computer games designed for use by and between interactive computer users. Similarly, U.S. Pat. No. 6,012,984 to Roseman, issued Jan. 11, 2000, describes a system for providing large arena games over computer networks.

In light of these developments, it is not surprising that the ideas of video gaming and interactive gaming went hand in hand, and eventually lead to the creation of a new and exciting market, namely on-line computer gaming. The rapid growth of the Internet network, which by now has achieved the status of an almost omnipresent medium, provides not only the basis, but also the boost for the constant developments in on-line computer gaming. During the last couple of years, on-line computer gaming has gained increasing popularity, and different Gaming Service Providers (GSP) have established themselves on the Internet network. On-line computer gaming is fast becoming a major money generating competitive virtual sport with tournament organizations and ranking services dedicated to providing the on-line community with the latest information and current rankings of global Internet gamers and game players. An interactive game server and on-line community forum is for example described in U.S. Pat. No. 6,339,761 to Sparks II, issued Mar. 5, 2002.

The tentative use of an interactive computer game to publicize a new movie also demonstrates a new potential use of on-line gaming in advertising. The interactive computer game was set up to allow the user to explore the set of the movie, meet major characters, and provide feedback to the directors on the potential outcome of the story while the film was still in production. It is very possible that directors and studios will use such interactive games in order to test the market's receptiveness to new story concepts. It is conceivable that a much better advertising campaign could be run through the net and an interactive on-line computer game than could ever be run with conventional means.

Computer gaming is constantly growing. Today thousands of players are playing on-line all around the world. Many people stereotype this group as techno kids only, but this could not be more wrong. Both females and males of all ages can be found daily trying to out-think, out-maneuver, or just having a good time on-line. On the Eve of the Electronic Entertainment Expo (E3Expo), the world's largest trade event showcasing computer and video games and related products, a new survey by Peter D. Hart Research Associates, Inc., has found that three-in-five Americans age six or older, or about 145 million people, say they routinely play computer or video games, and that nearly half of these game players are female. However, as illustrated in the example above, interactive on-line computer gaming will blur the line between games and other entertainment or communication media, and the avenues explored in the development of on-line gaming might well break new ground for interactive Internet applications in all areas of business relations and social life.

According to The Forester Report dated August 2000, pervasive gaming goes mainstream, and Internet-connected consoles powered by broadband networks are advancing. As a result, pervasive gaming will appeal to a mass-market audience and generate $26 billion in revenue by 2005, with an estimated number of 43.5 million connected consoles. However, under today's model, while the developments in broadband network technology are very promising, uptake via gaming consoles will be limited due to the difficulty with a proper broadband installation of gaming consoles. It is necessary to exploit the evolution of the two emerging technologies, namely increased residential broadband access and the technical advancements relating to gaming consoles and interactive on-line gaming, in unison. Therefore, it is highly advantageous to provide a suite of tools for providing gaming services over broadband access networks. In this context, it is of advantage to utilize the concepts of thin client computing. The benefit of this approach is its ability to adapt to the individual information technology requirements of each user, as well as its ability to seamlessly integrate into traditional client/server computing environments. With the right combination of hardware and software, the benefits offered by a gaming service provider can be adapted for each type of user, while retaining the full potential of the gaming console connected to the broadband network.

OBJECT OF THE INVENTION

It is thus an object of the instant invention to provide a suite of tools for providing gaming services over a broadband access networks.

It is further an object of the instant invention to provide a method of how to incorporate said tools within existing gaming hardware.

It is another object of the instant invention to provide a suite of tools for managing, monitoring and debugging gaming consoles and gaming services over a broadband access network.

It is also an object of the instant invention to provide a method of how to incorporate the use of said managing, monitoring and debugging tools within existing gaming hardware.

SUMMARY OF THE INVENTION

In accordance to an aspect of the instant invention there is provided an interactive gaming system having customer located equipment and a gaming service provider. The customer located equipment is connected to the gaming service provider through a broadband access network, and includes at least one gaming console. The gaming console comprises a flat memory space for storing gaming software, a restricted kernel for running the gaming software on the gaming console, and for making hardware of the gaming console accessible to the gaming software, and a memory in contact with the restricted kernel for storing an ultra-thin client on the gaming console, wherein the ultra-thin client establishes a connection between the gaming console and the service provider, controls events taking place on the gaming console according to messages sent to and received from the gaming service provider, and provides an adaptive platform for a consistent gaming environment.

In accordance with an aspect of the instant invention there is further provided a method for providing an interactive gaming system service. The method includes the step of connecting customer located equipment and a gaming service provider through a broadband access network. The customer located equipment includes at least one gaming console, the gaming console comprising a flat memory space for storing gaming software, a restricted kernel for running the gaming software on the gaming console and for making hardware of the gaming console accessible to the gaming software, and non-volatile random access memory in contact with the restricted kernel, storing an ultra-thin client in memory. The method further includes the steps of establishing a connection between the gaming console and the service provider through the ultra-thin client, and controlling events taking place on the gaming console according to messages sent to and received from the gaming service provider.

BRIEF DESCRIPTION OF THE DRAWINGS

An exemplary embodiment of the present invention will be described in conjunction with the following drawings, in which similar reference numbers designate similar items.

DETAILED DESCRIPTION OF THE INVENTION

The present invention is now described with respect to a specific embodiment thereof, in which a gaming link architecture G_linkA is used to provide an on-line gaming service, and in which a certain gaming link protocol G_linkP is used to establish data communication within G_linkA. Of course, the invention described herein is not restricted to a particular example, which will be described in what follows, but equally applies to other architectures possibly used to establish and provide an on-line gaming scenario.

Figure 1:
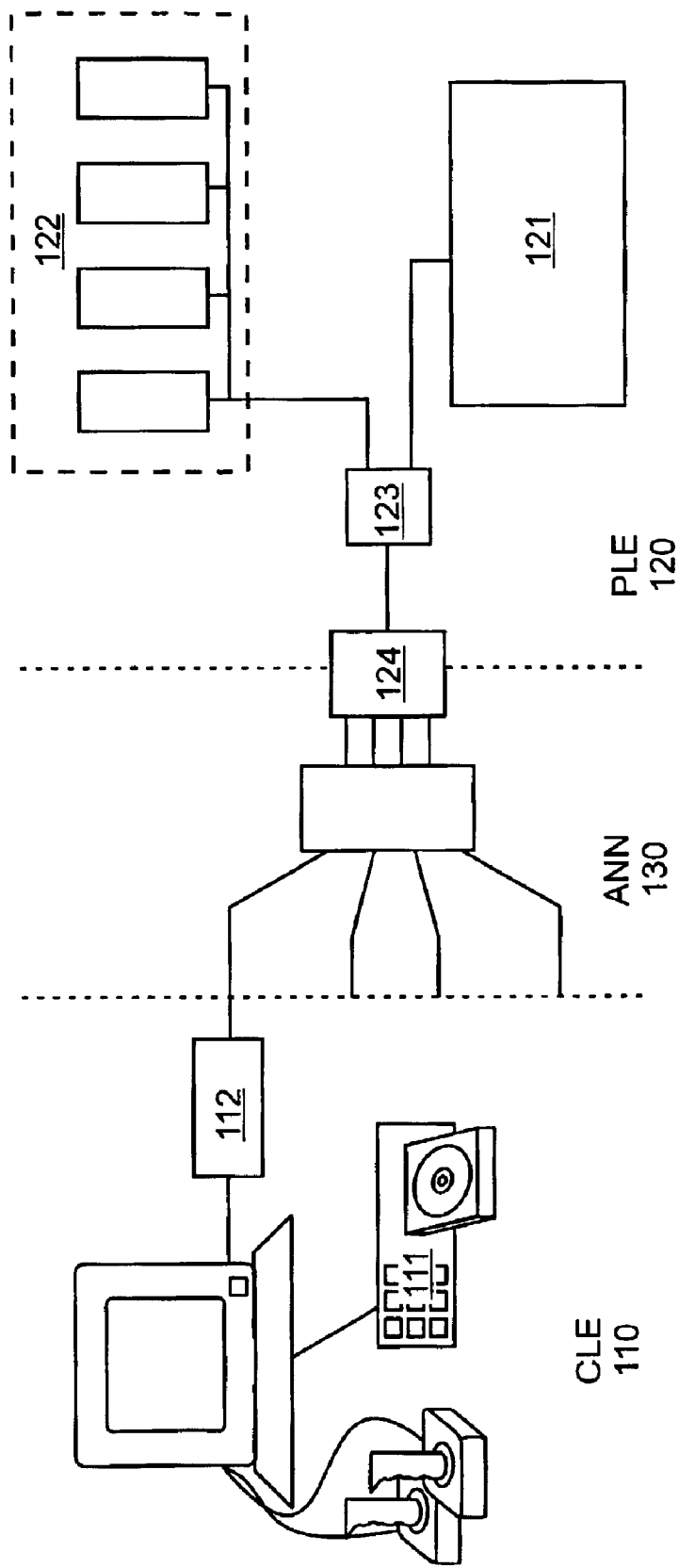
FIG. 1 displays a schematic diagram of an on-line gaming architecture.

Referring to FIG. 1, a schematic diagram of the gaming link architecture G_linkA for providing an on-line gaming environment is presented. The main components of G_linkA are a customer site containing customer located equipment CLE 110, a provider site containing provider located equipment PLE 120, and an access aggregation network AAN 130 connecting CLE 110 with PLE 120. The customer located equipment CLE 110 includes a gaming consol GC 111 and other hardware components necessary for playing a game, such as a monitor, joysticks, and the like, and a cable modem 112 for establishing the connection to the AAN 130. On the PLE site 120 there is located a gaming service provider network GSP 121, a management network 122 utilizing a multi-service operator's operations support systems MSO-OSS 123, a router 123 and a head-end 124, establishing the connection to the ANN 130, among other components. The access aggregation network ANN 130 generally is a wide area network WAN, and preferably a broadband access network BAN. However, local area networks LAN are also possible solutions for networks providing an on-line gaming service.

Figure 2:
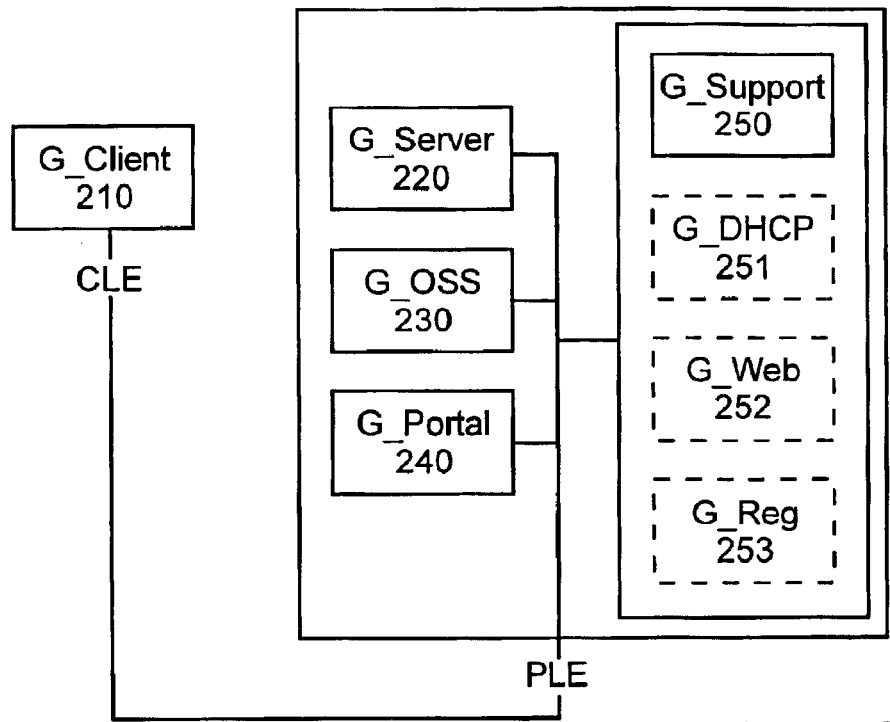
FIG. 2 displays a schematic diagram of an on-line gaming software architecture.

Referring now to FIG. 2, a schematic diagram is shown, illustrating the basic elements of the software architecture used in providing an on-line gaming environment. On the CPE site, the main component is a gaming client G_client 210, whereas on the PLE site there is a gaming server G_server 220, an operations support systems engine G_OSS 230, a gaming portal G_portal 240, and support services G_support 250.

The purpose of the gaming client G_client 210 is to provide the gaming console with services, such as establishing connectivity and registration. G_client 210 comprises a registration client, an authentication client, a console address management module, and a module for enabling connectivity and service to a gaming service provider GSP 121 on the PLE site 120. G_client 210 supports established methods for data communication and transfer, such as Point-to-Point Protocol PPP, and other recognized data protocols. G_client 210 checks for connection qualification, and administers bundled instrumentation.

Figure 3A:
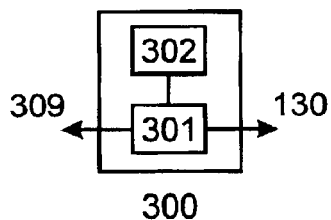
FIG. 3a displays a schematic diagram of a gaming console having a restricted kernel and a flat memory space.
Figure 3B:
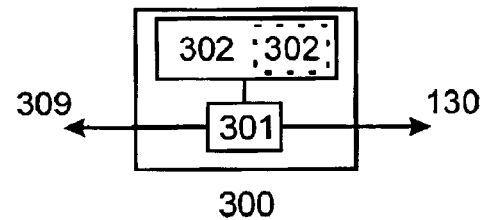
FIG. 3b displays a schematic diagram of a gaming console having a restricted kernel, a flat memory space; and a highly functional adaptive client framework incorporated into the flat memory space.
Figure 3C:
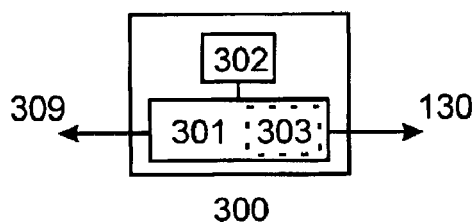
FIG. 3c displays a schematic diagram of a gaming console having a restricted kernel, a flat memory space; and a highly functional client incorporated into the restricted kernel.
Figure 3D:
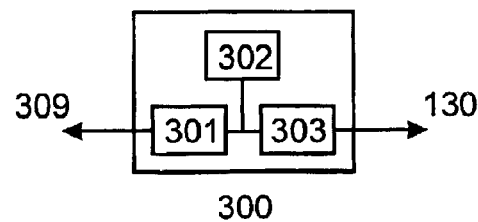
FIG. 3d displays a schematic diagram of a gaming console having a restricted kernel, a flat memory space; and a highly functional client residing in non-volatile random access memory.

There exist different solutions to the problem of choosing an ideal G_client 210 for a gaming environment. Typically, gaming consoles GC have a limited, flat memory space. On the other hand, a highly functional client is required, to be co-resident with the primary application in the gaming console (GC), the primary application typically being an on-line computer game. Referring to FIG. 3a, a schematic diagram of the architecture of a GC 300 is shown. The gaming console comprises a restricted kernel 301 and a flat memory space 302. The restricted kernel is in connection with the gaming consoles hardware 309, as well as with the flat memory space 302. Optionally, when the gaming console is used for on-line gaming, the restricted kernel 301 is in connection with the access aggregation network 130. The flat memory space typically comprises one single software application, namely a video game, or other gaming software. In order to install a highly functional client 303 on the GC, the client 303 is optionally integrated into the gaming software, and loaded together with the gaming software into the flat memory space 302. This solution is illustrated in the schematic diagram shown in FIG. 3b. However, in this set-up, changes in client modification require changes in the gaming software package. Another solution is to integrate the highly functional client 303 into the restricted kernel 301. This solution is illustrated in the schematic diagram shown in FIG. 3c. However, in this set-up two competing application are run in the restricted kernel 301, namely the gaming software and the highly functional client 303. This most likely has a negative effect on the gaming performance of the GC. A third solution, especially useful in connection with a broadband access network, is to dedicate a small random access memory (RAM) to the highly functional client 303, thus leveraging a high bandwidth connection to the gaming console, and using it to care and feed a highly functional client 303. Typically, the highly functional client 303 is an ultra-thin client UTC. In this case, the component G_client 210 is referred to as G_UTC.

The UTC constitutes a continuously resident, tiny core framework, in which client functionality is partitioned into small code segments, loaded and launched as required at run time. The code segments or packages are small, in general 50 KB or less, and with a broadband bandwidth of about 1 Mbps take a few hundred milliseconds to load. With UTC, there is no need to maintain state tables; UTC itself becomes a state onto itself, including possible launches from that state. UTC packages are thin, take little space away from the primary function of the GC, and do hardly interfere with the gaming software running on the GC.

As a further advantage, the gaming client G_Client 210 becomes very scalable and flexible, and is growing outside the GC without impacting the footprint occupied within the GC. As another advantage, client upgrades and updates are done automatically and in-service, value-added services are simple to include, and individual client services are easier to design and to implement. Also, client code portability between different gaming platforms is highly simplified. This way, G_UTC is a prototypical example for a highly functional client 303, and provides an adaptive platform for a consistent gaming environment.

Referring back to FIG. 2, software elements on the PLE site of the gaming architecture are now described in more detail. The purpose of the gaming server G_server 220 is to provide the connectivity and registration services for gaming consoles (GC), and to manage the registered devices. Typically, G_server 220 deals with console discovery, client registration, subscriber authentication, console address management, as well as Internet protocol (IP) connectivity management and proxy for gaming consoles (GC). G_server 220 also manages the different GC and different subscribers being part of the on-line gaming architecture G_linkA. Further, G_server 220 deals with connection qualification services for consoles, and with bundled instrumentation, and reports facilities for instrumentation, performance and management of G_client 210.

Another purpose of G_Server 220 is to perform additional tasks, and to provide managing, monitoring, and debugging facilities for the gaming link architecture. G_Server 220 performs tasks of checking network connections, and of controlling accessibility of relevant hardware components, as well as software modules. Debugging is preferably performed by sending out well-defined test messages, and by running well-defined test applications. Optionally, G_Server 220 performs the additional tasks in cooperation with other clients, as for example G_support 250 and G_OSS 230.

The purpose of the operation support systems engine G_OSS 230 is to provide an application program interface (API) to tie-in with the network service provider's software engines for subscriber authentication, notification, and billing functionalities. G_OSS 230 supports multi-protocol API, containing common utilities with plug-in adapters to facilitate connectivity to a majority of other operation support systems (OSS), the plug-in adaptation cartridges supporting Hyper Text Transfer Protocol (http), Simple Network Management Protocol (SNMP), eXtensible Markup Language (XML), JAVA™ and the like. Also, G_OSS 230 adds, modifies, or deletes a GC or a subscriber to the on-line gaming service, and takes care of billing and service notification, among other related functionalities.

The purpose of the gaming portal G_portal 240 is to provide a site for net-based gaming services. It also acts as a proxy site through which net-based game content providers offer content and services to the user of the gaming console GC. G_portal 240 provides an entry point into the on-line gaming network for game specific servers, for connection servers enabling group gaming, head-to-head services and find-a-friend scheduling, for bulletin boards and chat rooms, as well as for gaming sites and news proxy. Also, G_portal 240 provides the possibility to tie in the gaming link architecture to make services offered by other providers accessible to a user of the gaming console, such as for example services provided by the hospitality industry.

Optionally, G_portal 240 offers possibilities such as pay-per-play services, advertising, download services, and others. Although designed as an on-line gaming environment, G_portal 240 enables one to extend the uses of a plurality of gaming consoles (GC) interconnected through a broadband access network beyond gaming and entertainment.

The system of support services G_support 250 fulfills functions such as running a dynamic host configuration protocol (DHCP), Web servicing, platform and application management, subscriber management, license servicing, and the like. Within the system of support services, there is a dynamic host configuration protocol server G_DHCP, a Web server G_Web dealing with GSP content, GSP data, and GSP instrumentation, as well as a registration server G_Reg.

The protocol G_linkP is used to establish communication within the gaming architecture G_linkA, and is used in supporting the intermodule signaling and control communication and small batch data transfer. G_linkP further enables the use of ultra-thin clients (UTC) for gaming consoles (GC). In the present embodiment of the instant invention, the communication medium is an IP-based, packet protocol, running on top of the Point-to-Point Protocol (PPP) including PPP use over Ethernet (PPPoE), utilizing XML for external interfaces, and supporting both connected clients via the Transmission Control Protocol (TCP) as well as connectionless clients via the User Datagram Protocol (UDP). Further, G_linkP attempts to keep small messages, typically smaller than the maximum transmission unit (MTU).

All protocol messages have a common base structure, consisting of header, payload, and tail. The header includes information regarding protocol version, message type, control flags, sequence counter, security field, identification of the originating module, identification of the destination module, gaming console class, gaming console vendor, gaming console model, payload size, payload type, and other relevant data characterizing the type and format of the message. The payload contains the main body of the message, comprising any or all of unstructured binary data, structured, formatted data, XML-text-based data, and other interpretable data. Optionally, depending on the message type, the tail comprises a sequence counter, a security field, and/or control flags.

Typical message types of the gaming link protocol include a login-message GlP_hello, a response message GlP_Rsp, a request for registration GlP_RReq, an acknowledgment message GlP_ACK, as well as a non-acknowledgement message GlP_NAK, an information package GlP_info, a data package GlP_data, and a control package GlP_control. The main communication between the CLE site 110 and the PLE site 120 over the AAN 130 is handled by the client server G_client 210 and the support services G_support 250. More specifically, when the highly functional client is an ultra-thin client, gaming services are controlled and administered by the modules G_UTC, G_DHCP, G_Web, and G_Reg in conjunction with G_Server 220.

Figure 4A:
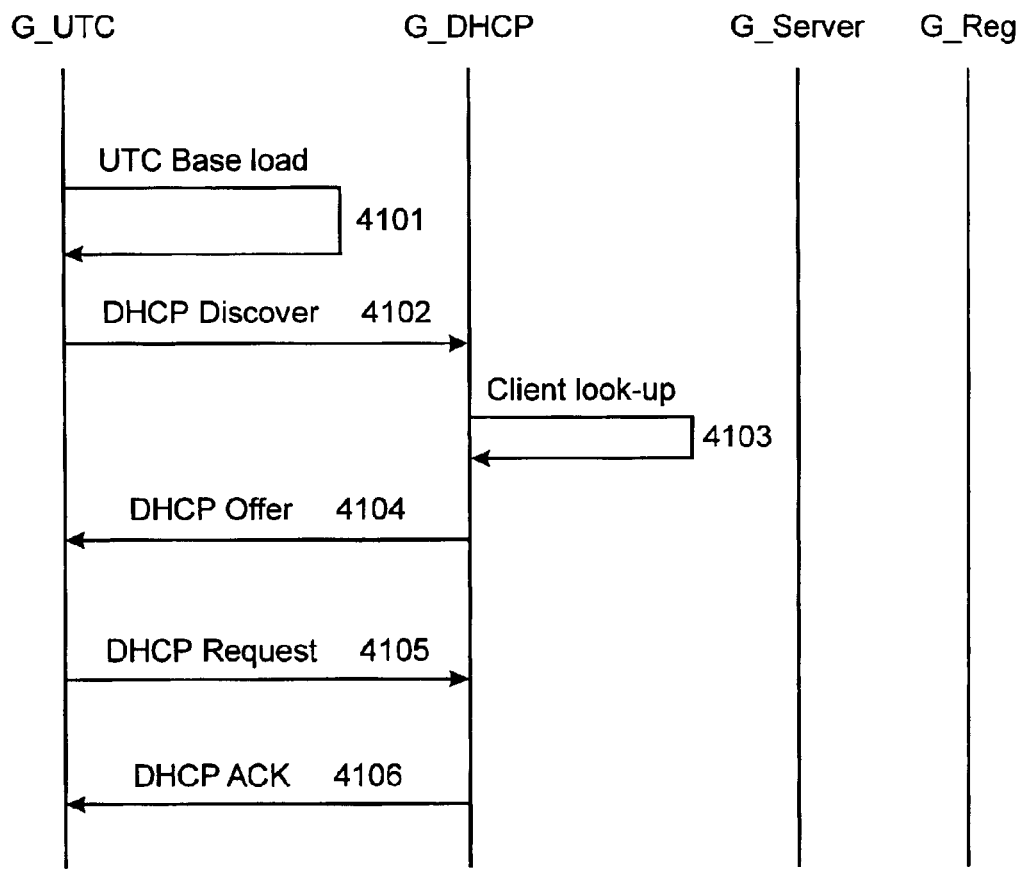
FIG. 4a displays a message sequence chart for a boot process of a gaming console being part of an on-line gaming architecture.

Referring now to FIG. 4a, a message sequence chart (MSC) is shown for the boot process of the gaming console GC. Loading the UTC base, step 4101, initializes the sequence. In this step, client identification (ID), information regarding the make and the model of the GC, as well as the Internet Protocol (IP) address all are retrieved from the non-volatile random access memory (NVRAM). In a next step, the DHCP discovery step 4102, information is passed to G_DHCP, such as the media access control (MAC) address, client ID, and IP address. The server G_DHCP performs a client look-up, step 4103, comparing the provided information against information of clients that are already registered. When no match is found, an unregistered user is detected, and a registration procedure begins. When a match is found, a registered user is detected, and a download procedure begins.

In the registration procedure, the boot process is completed in that the DHPC server offers information to G_UTC, step 4104, the information including a temporary client ID, a temporary IP address, a temporary mask, a current server ID, as well as a next server IP address referring to G_Reg. G_UTC updates the information and sends an updated request to G_DHCP, step 4105, which then is properly acknowledged, step 4106. The client is now ready to authenticate and register, being granted temporary presence solely for registration and authentication purposes. In the download procedure, the boot process is completed in that the DHPC server offers information to G_UTC, step 4104, the information including temporary client ID, a temporary IP address, a temporary mask, a current server ID, as well as a next server IP address referring to G_Web. G_UTC updates the information and sends an updated request to G_DHCP, step 4105, which then is properly acknowledged, step 4106. The client is now ready for service; if the IP address and mask acknowledged by G_DHCP does not match the information stored in NVRAM, then NVRAM is updated.

Figure 4B:
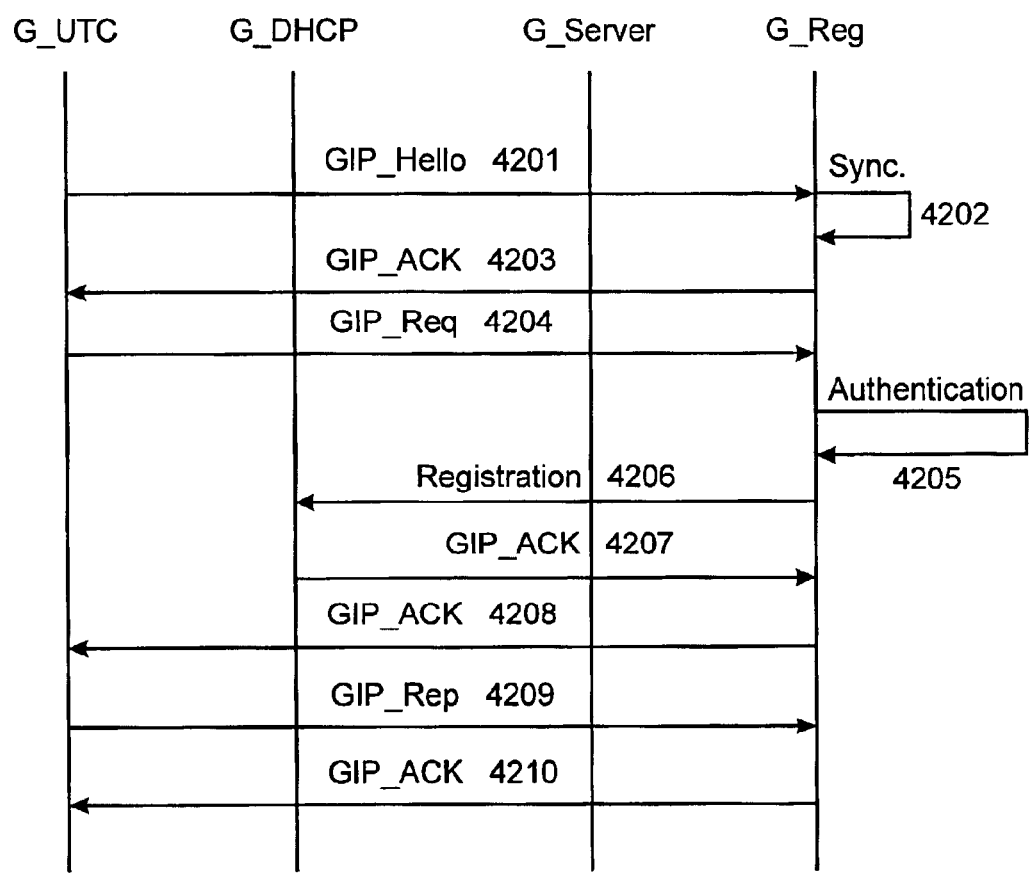
FIG. 4b displays a message sequence chart for a registration process of a gaming console being part of an on-line gaming architecture.

Referring now to FIG. 4b, a message sequence chart (MSC) is shown for a registration process. The client G_UTC sends a login message GlP_hello to the registration server G_Reg, step 4201, containing console information and information regarding the G_linkP protocol. G_Reg then performs a synchronization step 4202. If an unsupported version of G_linkP is detected, the client G_UTC will be updated. In case the synchronization was successful, G_Reg sends an acknowledgement to G_UTC, step 4203, which is answered by a request for registration, step 4204. In an authentication process, step 4205, G_OSS is used to authenticate decrypted parameters against a user account with the network service provider NSP. If the authentication is successful, a registration process follows, step 4206, in which a new client record is created in G_Server, and G_DHCP is updated. After proper acknowledgment from G_DHCP, step 4207, G_Reg in turn acknowledges the successful procedure to G_UTC, step 4208. G_OSS indicates a new service added to the existing client record. G_UTC then sends a data response GlP_Rsp, step 4208, optionally encrypted with GlP_hello message values, which is acknowledged with a new client ID, step 4210. The registration procedure is now complete, and G_UTC loads the new client ID into NVRAM and resets.

Figure 4C:
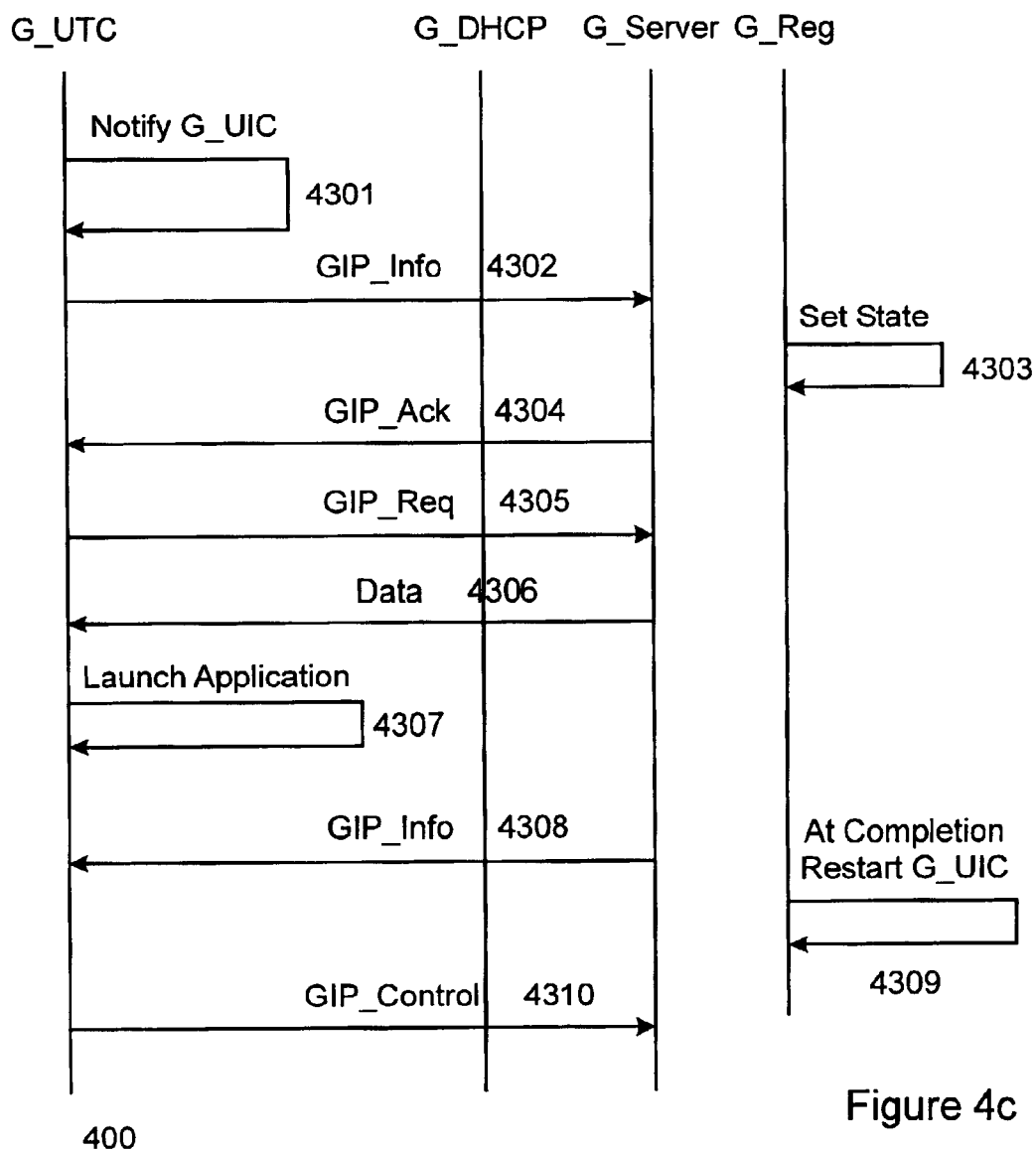
FIG. 4c displays a message sequence chart for a download process of a gaming console being part of an on-line gaming architecture.

Referring now to FIG. 4c, a message sequence chart (MSC) is shown for a download process. A subscriber is connected to the gaming architecture via a gaming console (GC). G_UTC is running on the gaming console, and after successfully registering the GC, G_UTC offers a menu of selections to the subscriber. The subscriber's selection results in downloading a game to the GC. In step 4301, G_UTC is notified by the subscriber to load an external game or an external application. The file name of the application is preserved, while all previously loaded modules residing in flat memory space are destroyed. G_UTC is now prepared to activate a new game. Next, an information package is transferred to G_Server, step 4302, reporting on the currently active G_UTC element. G_Server then sets the active state, step 4303, in which the client record is updated for the currently active state, in which a proper history counter is selected, and in which it is acknowledged that an application is to be run. After the client ID is transmitted back to G_UTC in an acknowledgement step 4304, a download request is issued, step 4305, and data are transmitted from G_Web to the gaming console, step 4306. Next, an application is launched, step 4307, either as download from G_Web, or from a local medium connected to GC, such as a hard disc, compact disc, cartridge, or the like. After the application is launched, G_UTC stays active but inert until the application is completed. An information package is then transmitted form G_UTC to G_Server, step 4308, informing the support server about the active UTC element for a given client ID. G_Server then sets up for a restart of G_UTC, step 4309. In the simplest case, a request to reactivate G_UTC is sent. Optionally, G_UTC is reset to the last active G_UTC module reloaded by the G_UTC base. Finally, control information is sent to G_UTC, step 4310, offering the subscriber several new selections, incorporating the recent history of events taken place in G_linkA.

Figure 4D:
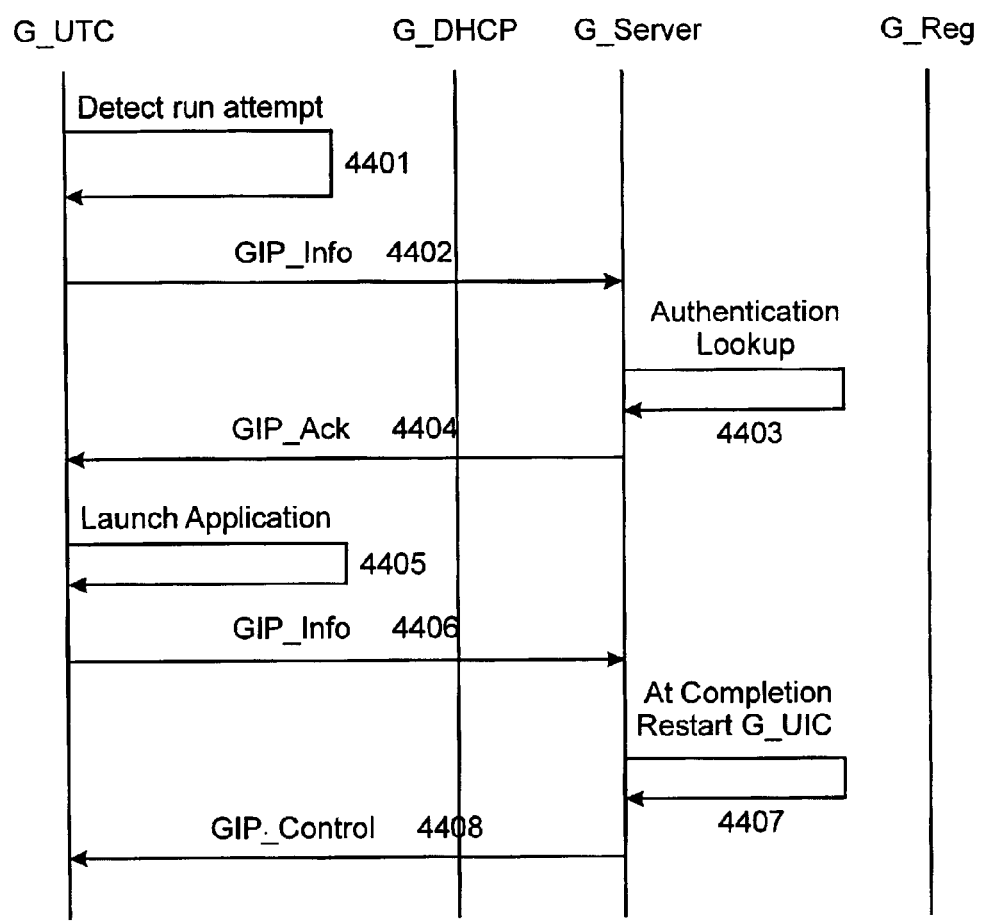
FIG. 4d displays a message sequence chart for running a saved game on a gaming console being part of an on-line gaming architecture.

Referring now to FIG. 4d, a message sequence chart (MSC) is shown for running a saved game. In this scenario, a G_UTC module is already running, and a subscriber attempts to run a preserved binary file. G_UTC then detects a run attempt from a given application, step 4401. Information about client ID and application ID is sent to G_Server, step 4402. An authentication lookup is performed, step 4303, in which the client record is checked to determine a right-to-use for the particular application. If the check in unsuccessful, G_UTC will be notified in form of a no-right-to-use message. If the check is successful, the application is acknowledged, step 4304. Next, the application is launched on the gaming console, step 4305, either as download from G_Web, or from a local medium connected to GC, such as CD or a disc. Gaming information is provided from G_UTC to G_Web, step 4406, and after the application is completed, G_Web sets up for a restart of G_UTC, step 4407, and sends corresponding control information including new selection menus and related information to G_UTC, step 4408.

The above-described procedures illustrate the basic modus operandi of the instant invention, and it is obvious to a person of skill in the art that the presented communication protocols are easily extended to incorporate and fulfill a variety of other functionalities. For example, step 4301, in which a subscriber is offered a menu of selections for downloading a game, is easily modified in that the selection of choices is set up according to preferences specified by the subscriber. This way, an authorization of gaming content is achieved, and a gaming request is filtered through G_UTC before execution.

In a similar way, desired gaming scenarios are possibly selected, including preferences for meet-me gaming, challenge-me gaming, and the like. The possibility of personalizing a GC through the use of the UTC extends the mere entertaining character of a gaming experience, and adds a personal, socially interactive component to the on-line experience. In this context, peer-to-peer introductions are easily envisioned, and the group dynamical content added to the on-line gaming scenario promises a socially rewarding gaming experience. Furthermore, peer-to-peer introduction is not limited to on gaming service provider network, but is easily extended to incorporate the concept of inter-GSP gaming communication.

As described above, the gaming request received from the gaming console is filtered according to certain predefined criteria. Optionally, a personal profile of a subscriber to the on-line gaming services is created according to characteristics described by the subscriber. The personal profile is optionally saved on the provider located equipment side, and is identified through the client ID, the corresponding IP address, and the like.

Also, the described architecture is suitable for bit-cap exemptions. Due to the functionality of the highly efficient client, data streams dedicated to gaming data are optionally not bit-cap counted, thus providing a financially attractive gaming solution to the subscriber to an on-line gaming service.

Further, UTC is used to run other than gaming applications on the GC, and therefore allows one to extend the use and functionality of a GC beyond mere electronic entertainment.

Although the instant invention has been described with respect to a specific embodiment thereof, various changes and modifications are optionally carried out by those skilled in the art without departing from the scope of the invention. Therefore, it is intended that the instant invention encompass such changes and modifications as fall within the scope of the appended claims.

What is claimed is:

1. An interactive gaming system having customer located equipment and a gaming service provider, the customer located equipment being connected to the gaming service provider through a broadband access network, the customer located equipment including at least one gaming console, the gaming console comprising:
   a flat memory apace for storing gaming software;
   a restricted kernel for executing the gaming software on the gaming console, and for making hardware of the gaming console accessible to the gaming software; and
   a memory in contact with the restricted kernel for storing an ultra-thin client on the gaming console the restricted kernel for executing the ultra thin client software during a same period of time as the gaming software is executed;
   wherein execution of the ultra-thin client stored in the memory in contact with the restricted kernel establishes a connection between the gaming console and the service provider, controls events taking place on the gaming console according to messages sent to and received from the gaming service provider during execution of the gaming software other than the ultra-thin client, and provides an adaptive platform for a consistent gaming environment.

2. An interactive gaming system according to claim 1, wherein the ultra-thin client filters a gaming request received from gaming software in execution within the gaming console according to at least one predefined criterion.

3. An interactive gaming system according to claim 2, wherein the ultra-thin client filters a gaming request received from gaming software in execution within the gaming console according to a personal profile provided by a subscriber to the interactive gaining system.

4. An interactive gaming system according to claim 3, wherein the ultra-thin client filters a gaming request received from gaming software in execution within the gaming console in accordance with the personal profile according to a content of the game requested.

5. An interactive gaming system according to claim 3, wherein the ultra-thin client filters a gaming request received from gaming software in execution within the gaming console in accordance with the personal profile according to a skill level of a person requesting the game.

6. An interactive gaming system according to claim 3, wherein the ultra-thin client filters a gaming request received from gaming software in execution within the gaming console in accordance with the personal profile according to personal characteristics of a person requesting the game.

7. An interactive gaming system according to claim 1, wherein the ultra-thin client is active but inert when gaming software is run in the restricted kernel.

8. An interactive gaming system according to claim 1, wherein the ultra-thin client runs tasks in the restricted kernel when no gaming software is run in the restricted kernel.

9. An interactive gaming system according to claim 8, wherein the tasks run in the restricted kernel are tasks unrelated to interactive gaming.

10. An interactive gaming system according to claim 1, wherein the gaming service provider provides software clients for performing a maintaining task of the interactive gaming service in cooperation with the ultra-thin client.

11. An interactive gaining system according to claim 10, wherein the maintaining task includes monitoring a network functionality of the interactive gaming system.

12. An interactive gaming system according to claim 10, wherein the maintaining task includes debugging the interactive gaming system.

13. A method for providing an interactive gaming system service, the method comprising:
   connecting customer located equipment and a gaming service provider through a broadband access network, the customer located equipment including at least one gaming console, the gaming console comprising a flat memory space for storing gaming software, a restricted kernel for running the gaming software on the gaming console, and for making hardware of the gaming console accessible to the gaming software, and non-volatile random access memory in contact with the restricted kernel, storing an ultra-thin client in the flat memory space;

establishing a connection between the gaming console and the service provider through the ultra-thin client;

executing a game application on the gaming console separate from the ultra this client; and controlling events taking place on the gaming console during execution of a game application other than the ultra-thin client according to messages sent to and received from the gaming service provider.

14. A method for providing an interactive gaming system service according to claim 13, further comprising filtering a gaming request received by the ultra this client from a game in execution on the gaming console according to at least one predefined criterion.

15. A method for providing an interactive gaming system service according to claim 14, wherein a gaming request received from the gaming console is filtered according to a personal profile provided by a subscriber to the interactive gaming system.

16. A method for providing an interactive gaming system service according to claim 13, wherein the ultra-thin client runs tasks in the restricted kernel when no gaming software is run in the restricted kernel.

17. A method for providing an interactive gaming system service according to claim 16, wherein the tasks run an the restricted kernel are tasks unrelated to interactive gaming.

18. A method for providing an interactive gaming system service according to claim 13, including the step of updating the ultra-thin client in dependence upon message data received from the gaming service provider.

19. A method for providing an interactive gaming system service according to claim 18, wherein the step of updating includes the step of providing a first ultra-thin client to a gaming console of a first type and providing a second other ultra-thin client to a gaming console of a second other type.

20. A method for providing an interactive gaming system service according to claim 13, including the step of at boot-up, updating the ultra-thin client to an ultra-thin client in dependence upon a last loaded ultra-thin client.

21. A method for providing an interactive gaming system service according to claim 13, including the step of at boot-up executing a predetermined default ultra-thin client on the gaming console.

22. A method for providing an interactive gaming system service according to claim 13, including the step of tracking billing related data for the gaming console within the ultra-thin client/server pair.

* * * * *